United States Patent
Tehranipoor et al.

(10) Patent No.: US 11,030,348 B2
(45) Date of Patent: Jun. 8, 2021

(54) CIRCUIT EDIT AND OBFUSCATION FOR TRUSTED CHIP FABRICATION

(71) Applicant: UNIVERSITY OF FLORIDA RESEARCH FOUNDATION, INCORPORATED, Gainesville, FL (US)

(72) Inventors: Mark M. Tehranipoor, Gainesville, FL (US); Domenic J. Forte, Gainesville, FL (US); Bicky Shakya, Gainesville, FL (US); Navid Asadizanjani, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 188 days.

(21) Appl. No.: 16/309,239

(22) PCT Filed: Jun. 15, 2017

(86) PCT No.: PCT/US2017/037758
§ 371 (c)(1),
(2) Date: Dec. 12, 2018

(87) PCT Pub. No.: WO2017/218829
PCT Pub. Date: Dec. 21, 2017

(65) Prior Publication Data
US 2019/0311156 A1    Oct. 10, 2019

Related U.S. Application Data

(60) Provisional application No. 62/351,490, filed on Jun. 17, 2016.

(51) Int. Cl.
*G06F 21/75* (2013.01)
*G06F 21/76* (2013.01)
(Continued)

(52) U.S. Cl.
CPC .............. *G06F 21/75* (2013.01); *G06F 21/76* (2013.01); *G06F 30/327* (2020.01); *G06F 30/39* (2020.01);
(Continued)

(58) Field of Classification Search
CPC .......... G06F 21/75; G06F 21/00; G06F 30/39; G06F 30/347; G06F 30/396;
(Continued)

(56) References Cited

U.S. PATENT DOCUMENTS

| 7,480,888 B1 * | 1/2009 | Ogilvie | ................ G06F 30/34 716/101 |
| 8,508,370 B1 * | 8/2013 | El-Kady | ............... G08B 13/14 340/572.1 |

(Continued)

FOREIGN PATENT DOCUMENTS

WO    WO 2015/100158 A1    7/2015

OTHER PUBLICATIONS

Chen, Shuai, et al., "Chip-level Anti-reverse Engineering using Transformable Interconnects", Proceedings of 2015 IEEE International Symposium on Defect and Fault Tolerance in VLSI and Nanotechnology Systems (DFTS), Oct. 12-14, 2015, pp. 109-114, Amherst, MA, USA.
(Continued)

*Primary Examiner* — Malcolm Cribbs
*Assistant Examiner* — Stephanie S Ham
(74) *Attorney, Agent, or Firm* — Alston & Bird LLP

(57) ABSTRACT

Circuits and methods for protecting against intellectual property piracy and integrated circuit piracy from an untrusted third party are provided. A circuit can include an original circuit and an obfuscated circuit incorporated into the original circuit and changing the output of the original circuit, wherein the obfuscated circuit is configured to (Continued)

recover the output of the original circuit by modifying the obfuscated circuit. In addition, a method of manufacturing a semiconductor device can include designing a circuit including an original circuit and an obfuscated circuit, and fabricating the circuit, wherein the obfuscated circuit is configured to change an output of the original circuit and to recover the output of the original circuit by modifying the obfuscated circuit.

24 Claims, 15 Drawing Sheets

(51) Int. Cl.
*H01L 21/762* (2006.01)
*H01L 23/00* (2006.01)
*G06F 30/39* (2020.01)
*G06F 30/327* (2020.01)
*G06F 30/394* (2020.01)
*G06F 30/333* (2020.01)

(52) U.S. Cl.
CPC .......... *G06F 30/394* (2020.01); *H01L 21/762* (2013.01); *H01L 23/573* (2013.01); *G06F 30/333* (2020.01)

(58) Field of Classification Search
CPC ............... G06F 30/398; G06F 2111/00; G06F 2119/22; G06F 30/394; G06F 30/3947; G06F 30/3953; G06F 30/327; G06F 30/323; G06F 21/76; G06F 30/333; H01L 21/762; H01L 21/70; H01L 21/573; H01L 23/57; H01L 23/00
See application file for complete search history.

(56) References Cited

U.S. PATENT DOCUMENTS

| | | | | |
|---|---|---|---|---|
| 2004/0185580 | A1* | 9/2004 | Goh | H01L 21/67092 438/5 |
| 2006/0035443 | A1* | 2/2006 | Hsu | H01L 21/2007 438/464 |
| 2008/0028345 | A1* | 1/2008 | Suri | G06F 30/30 716/132 |
| 2011/0113392 | A1* | 5/2011 | Chakraborty | G06F 30/327 716/102 |
| 2016/0034694 | A1 | 2/2016 | Rajendran et al. | |
| 2016/0341786 | A1* | 11/2016 | Pileggi | G01R 31/2818 |

OTHER PUBLICATIONS

International Searching Authority, International Search Report for Application No. PCT/US2017/037758, dated Oct. 31, 2017, 4 pages, Korean Intellectual Property Office, Republic of Korea.
Yadegari, Babak, et al., "A Generic Approach to Automatic Deobfuscation of Executable Code", Proceedings of 2015 IEEE Symposium on Security and Privacy (SP), May 17-21, 2015, pp. 674-691, retrieved from https://www.sysnet.ucsd.edu/~bjohanne/assets/papers/2015oakland.pdf on Nov. 20, 2018.

* cited by examiner

|  | Split Manufacturing | Logic Locking | IC Camouflage | Circuit Edit |
|---|---|---|---|---|
| Protection Against Untrusted Foundry | ✓ | ✓ | ✗ | ✓ |
| Low Area Overhead | ✗ | ✗ | ✗ | ✓ |
| Low Performance Overhead | ✗ | ✗ | ✗ | ✓ |
| (Structural) Testability at Foundry | ✗ | ✓ | ✓ | ✓ |
| Low Cost for Design House | ✗ | ✓ | ✓ | ✓ |
| Minor Change to Design Flow (Pre-Foundry) | ✗ | ✓ | ✓ | ✓ |
| Minor Change (Post-Foundry) | ✗ | ✓ | ✓ | ✓ |
| No Key Management Required + Resistance to Key/Key Gate-Based Attacks | ✓ | ✗ | ✓ | ✓ |
| Security in Supply Chain | ✗ | ✓ | ✓ | ✗ |
| High Volume Production Possible | ✓ | ✓ | ✓ | ✗ |

*Low Volume Production: Suitable for Research Labs, DoD-type Applications*

CIRCUIT EDIT AND OBFUSCATION FOR TRUSTED CHIP FABRICATION

CROSS REFERENCE TO RELATED APPLICATIONS

This application is a National Stage Application, filed under 35 U.S.C. 371, of International Application No. PCT/US2017/037758, filed Jun. 15, 2017, which claims the benefit of U.S. Provisional Patent Application Ser. No. 62/351,490, filed Jun. 17, 2016, which are incorporated herein by reference in their entirety, including any figures, tables, and drawings.

GOVERNMENT SUPPORT

This invention was made with government support under Grant No. FA9550-14-1-0351 awarded by the U.S. Air Force Office of Scientific Research (USAF/AFSOR). The government has certain rights in the invention.

BACKGROUND OF THE INVENTION

The integrated circuit (IC) business scheme has changed over the last few decades as semiconductor scaling has reached a submicron level. A facility to manufacture a submicron semiconductor device requires an investment of several billion dollars, and this business condition leads to a division between semiconductor companies to design the IC and foundry companies to manufacture the IC designed by the semiconductor company. Under this divided business model, though the semiconductor company designing the IC can reduce the manufacturing costs and respond quickly to the market needs, the risk of security increases because the IC design company cannot control the whole process, particularly the manufacturing process. An untrusted third party foundry could reverse-engineer a layout for the IC design, or a hacker could pirate the intellectual property (IP). Camouflaging circuits including dummy contacts or a split manufacturing process have been developed. However, these methods have considerable drawbacks in terms of design overhead, cost, and security.

BRIEF SUMMARY

Embodiments of the subject invention provide novel and advantageous circuits and semiconductor devices that include one or more obfuscated circuits corrupting a correct output of an intended original circuit for protecting intellectual property (IP) piracy or integrated circuit (IC) piracy from an untrusted third party, as well as methods of fabricating and using the same.

In an embodiment of the present invention, a circuit can include an original circuit and an obfuscated circuit incorporated into the original circuit and changing an output of the original circuit, wherein the obfuscated circuit is configured to recover the output of the original circuit by modifying the obfuscated circuit.

In another embodiment of the present invention, a semiconductor device can include a substrate, an original circuit formed on the substrate, and an obfuscated circuit formed on the substrate and configured to change an output of the original circuit, wherein the obfuscated circuit includes a pad for recovering the output of the original circuit by modifying the obfuscated circuit.

In another embodiment of the present invention, a method of manufacturing a semiconductor device can include designing a circuit including an original circuit and an obfuscated circuit, and fabricating the circuit, wherein the obfuscated circuit is configured to change an output of the original circuit and to recover the output of the original circuit by modifying the obfuscated circuit.

In another embodiment of the present invention, a method for designing a chip can include forming a netlist for an integrated circuit, and modifying the netlist, wherein the modifying of the netlist corrupts an intended output of the integrated circuit.

BRIEF DESCRIPTION OF THE DRAWINGS

FIGS. 2A-2D show technologies for protecting intellectual property (IP).

DETAILED DESCRIPTION

Embodiments of the subject invention provide novel and advantageous circuits, semiconductor devices, and methods for protecting from intellectual property (IP) piracy and integrated circuit (IC) piracy from one or more untrusted third parties. In the business condition that a semiconductor company, especially a design house, uses an off-site foundry company to fabricate an IC chip, the risk of IP piracy and IC piracy increases considerably. It is possible that the untrusted foundry company will overproduce the IC chip or insert a malicious circuit (e.g., hardware Trojan). IP piracy is a serious issue to design houses that not only wish to use off-site foundry companies having technological expertise but also want to protect their IP.

Figure 1A:
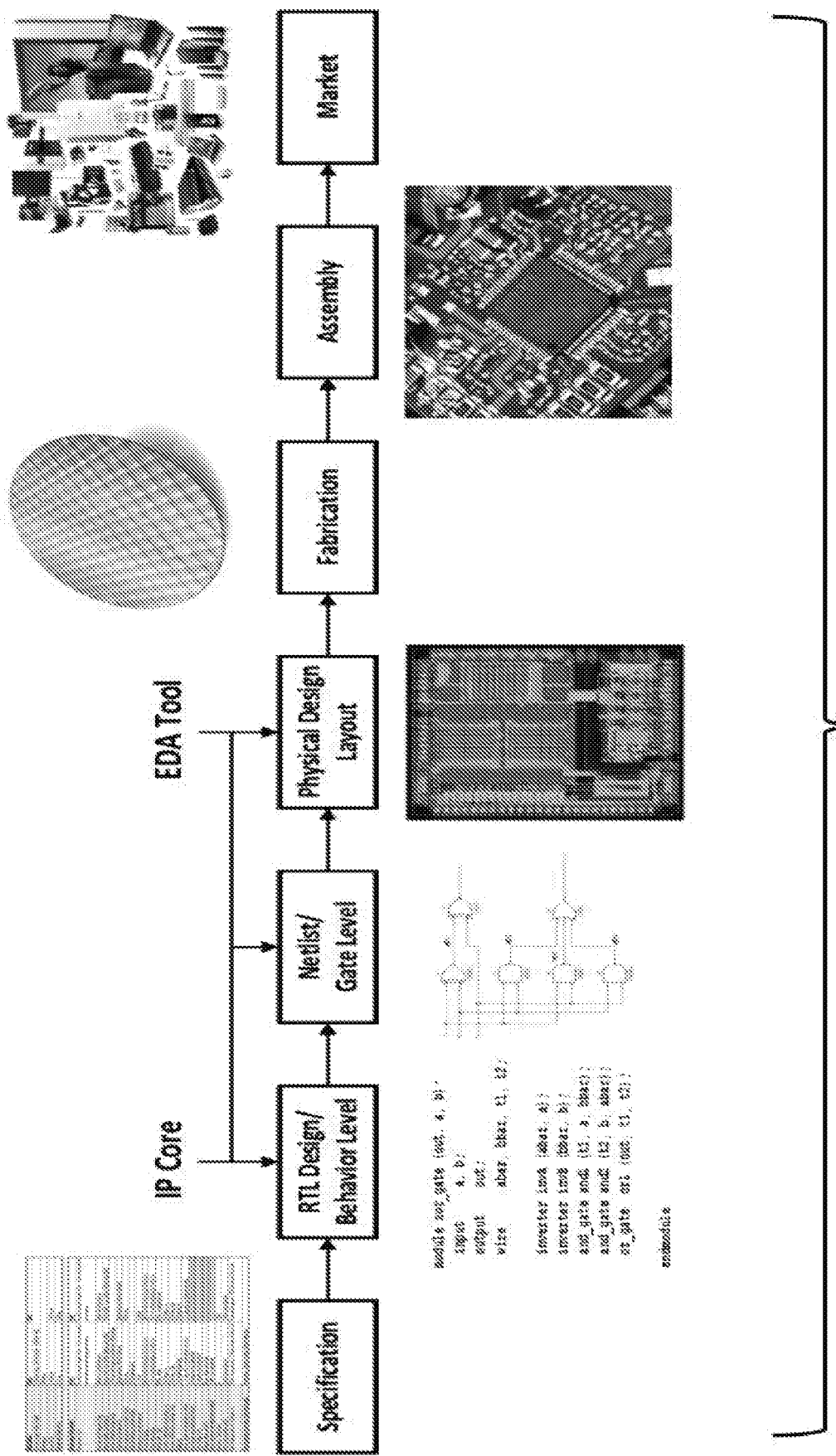
FIGS. 1A and 1B show horizontal business models of the semiconductor industry.
Figure 1B:
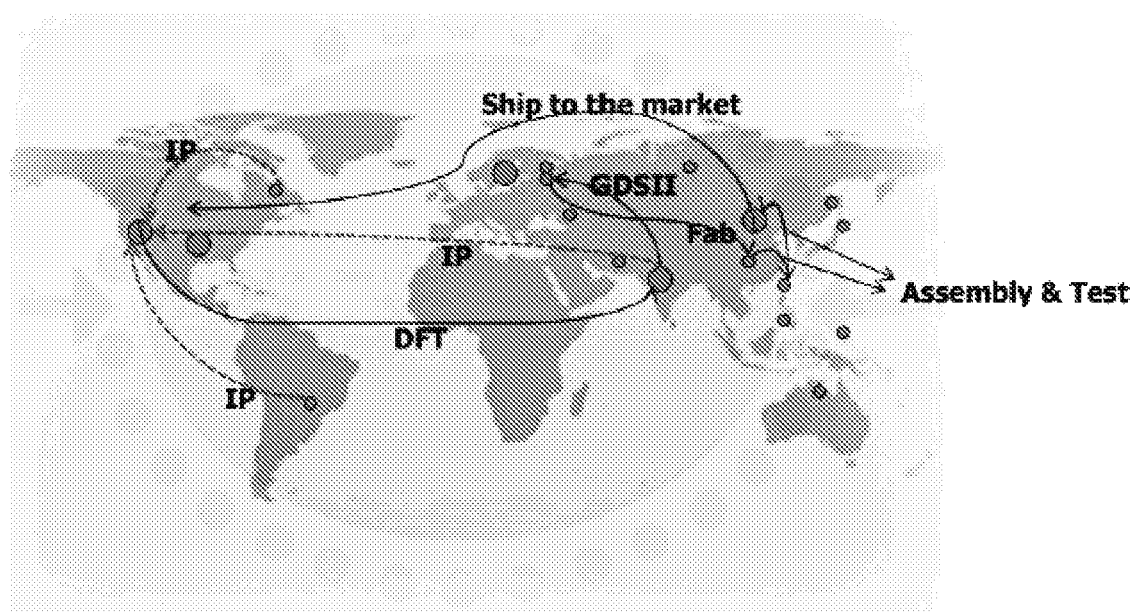

FIGS. 1A and 1B show a typical semiconductor business model. Referring to FIGS. 1A and 1B, a general semiconductor company designs a circuit according to a requested specification, fabricates the circuit, and sells a product realizing the circuit in the market. While many semiconductor companies can design the circuit in a register-transfer level (RTL) according to the specification, form a gate-level netlist, and draw a physical layout, they cannot fabricate the related chip without cooperation of third-party foundry companies because they do not own a fabrication facility, which typically requires an investment of several billion dollars. In addition, the assembly and test for the fabricated chip are also performed at sites other than at the semiconductor company designing the circuit and the foundry company fabricating the circuit. These business environments have created a horizontal business model in the semiconductor business. In recent years, the cost to build and maintain a top-end fabrication facility has exceeded $5 billion, and thus some semiconductor companies such as International Business Machines (IBM) have exited the foundry business [1]. As a result, foundry companies at advanced nodes are almost exclusively off-shore today. Thus, while a design house designing a circuit transfers extensive information, including GSDII, Netlist, and Test Vectors, to the off-site (e.g., off-shore) foundry company, the design house cannot completely control or monitor the off-site foundry company.

Figure 2A:
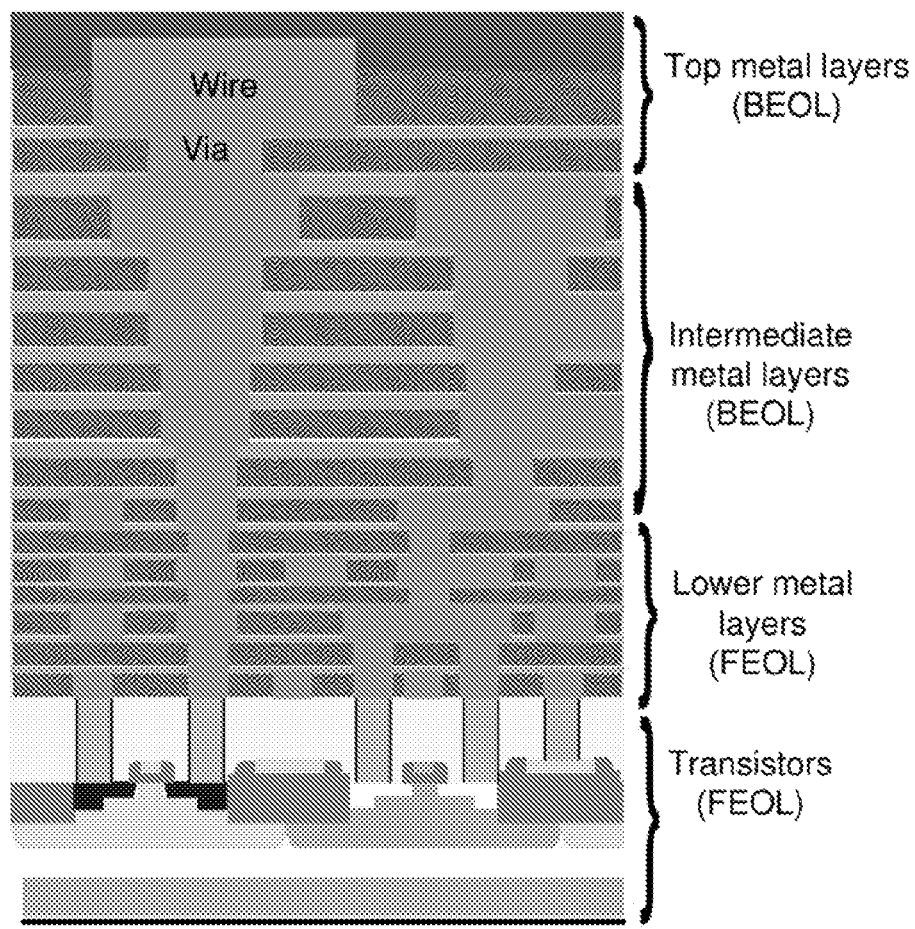

One technology to address this issue is split manufacturing. Split manufacturing divides a full design into Front End of Line (FEOL) and Back End of Line (BEOL) portions for fabrication by different foundry companies. Referring to FIG. 2A, which shows a cross-sectional view of a fabricated IC chip, the IC chip fabricated on a silicon wafer requires several metal layers in order to operate correctly. If a first foundry company makes the IC chip from a wafer level to the FEOL level and a second foundry company continues the manufacturing of the IC chip from the FEOL level to the BEOL level, neither foundry company has all the necessary information to fabricate the entire IC chip. Thus, even if one of the foundry companies were to pirate the information, the design company can protect at least a portion of its IP.

Figure 2B:
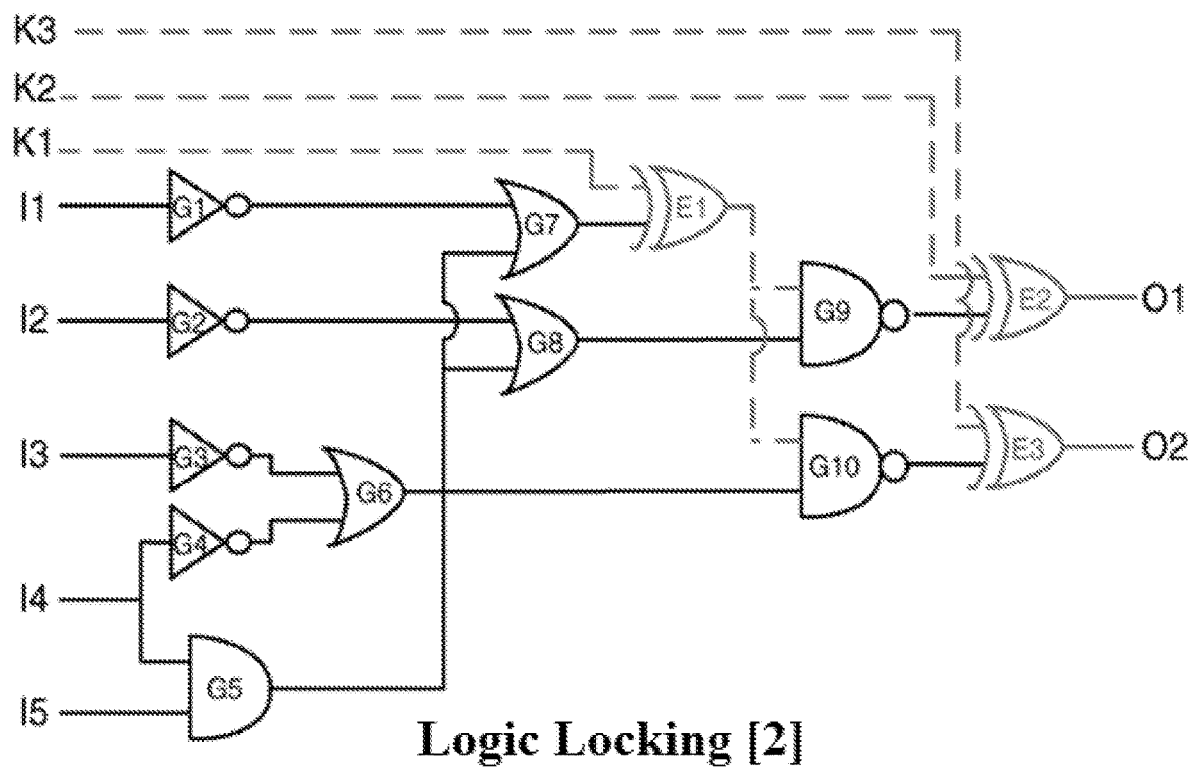

Also, logic encryption can enable a designer to controllably corrupt output of an original intended IC. FIG. 2B shows a logic locking example for logic encryption. The additional gates E1, E2, and E3 are inserted into the original intended IC design, and the keys K1, K2, and K3 connected to the additional gates E1, E2, and E3 corrupt the outputs. Even if this design were to be pirated, if there is no information about the correct keys and the additional gates, the pirating party would not be able to retrieve the original intended IC design.

Figure 2C:
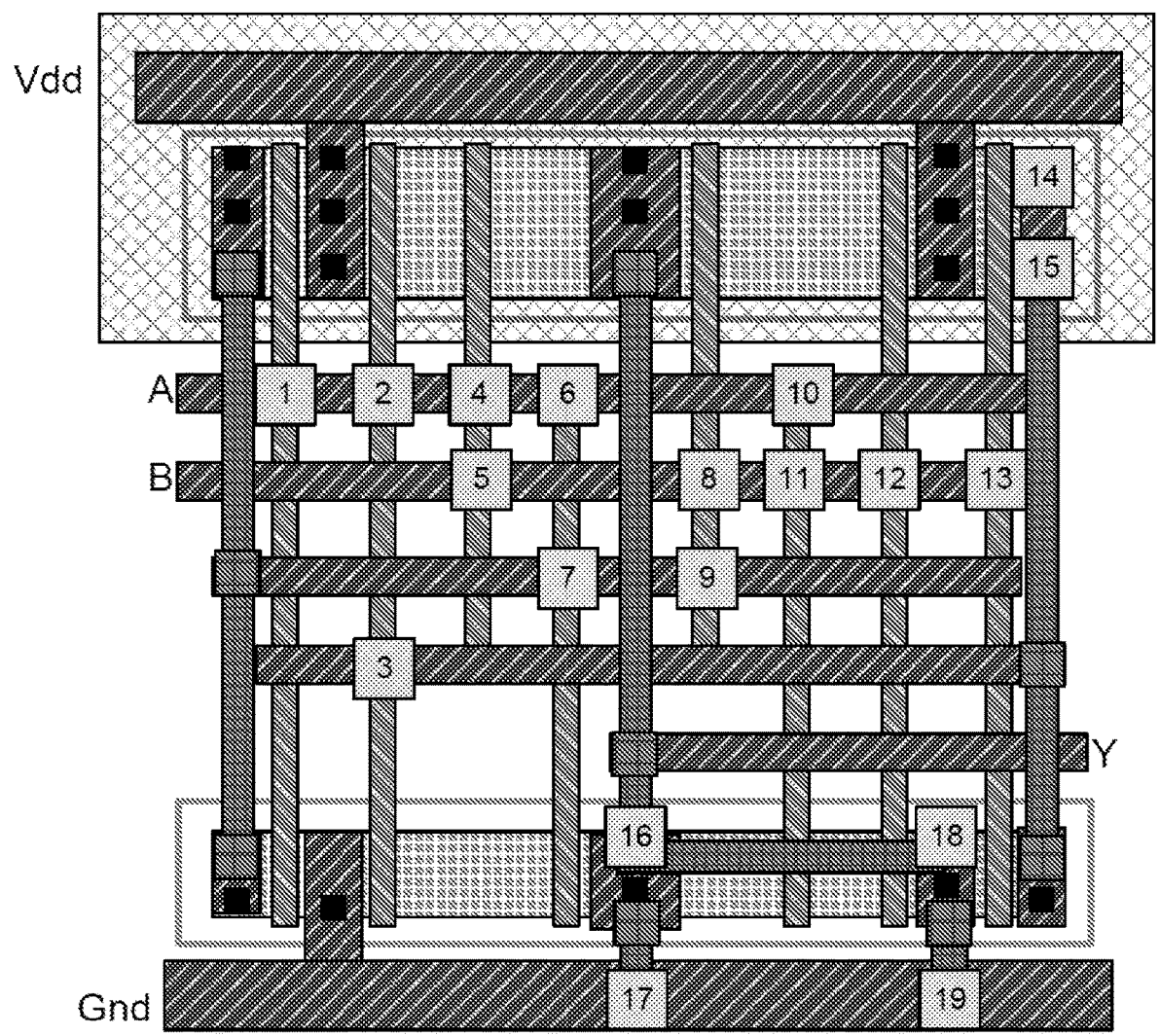

IC camouflaging can provide dummy contacts in an original layout. FIG. 2C shows a layout of a camouflaged cell that can function as either 2-input XOR, NAND, or NOR (FIG. 2C is from reference [4]). Although it appears that all contacts are same, some contacts are true contacts connecting metal layers and other contacts are dummy contacts disconnected from the metal layers. Thus, the camouflaged layout inhibits a third party from extracting the original intended IC design by reverse-engineering.

FIG. 2D is a table comparing split manufacturing, logic locking, IC camouflage, and circuit edit according to an embodiment of the present invention. Even though split manufacturing, logic locking, IC camouflage have some merit, they also have problems. For example, these methods, other than circuit edit according to an embodiment of the present invention, burden the semiconductor companies with significant overhead for area, performance, and/or cost, as well as reduced security.

In embodiments of the subject invention, trusted development and fabrication of integrated circuits (ICs) can be ensured by an obfuscation technique leveraging circuit edit. The technique relies on inserting additional logic components (e.g., gates, nets) into an integrated circuit design and/or modifying preexisting IC designs. The added/modified components can be inserted to corrupt the intended functional and structural information of the integrated circuit design. This obfuscated design can then be sent to a design-for-test (DFT) facility and, later, to a semiconductor fabrication facility, both off-site (and often overseas), which offer high-end fabrication/test infrastructures but are untrusted. Here, untrusted implies that the DFT/foundry entities could engage in IP and/or IC piracy, illicitly claiming/stealing the IP and/or IC design. Once the obfuscated design has been inserted with DFT infrastructure, it comes back to the original designer who can remove or bypass the obfuscation to retrieve the intended structure/function. In case of an IC fabricated through an untrusted foundry, the designer can leverage focused-ion-beam (FIB) technology or laser ablation technology (or other methods to remove layers of a chip or deposit metal or insulator contacts) to modify the obfuscated design and retrieve the original functionality, because he/she knows the exact location and identity of the gates or interconnects added/modified by him/her for obfuscation. The designer can also use special cell to create the integrated circuit IP at the layout level, and these can be modified with special pads and extra space to accommodate post-fabrication edit. Additionally, to ensure strong obfuscation, the designer can apply the modified cell design to several other pre-existing gates in the layout of the circuit, in order to obfuscate the identity and/or location of the modifications made by the designer for obfuscation. In case of integrated circuit intellectual property (e.g., in the form a netlist) returned from a DFT facility, the designer can remove and/or modify the gates and/or interconnects at the netlist level to retrieve the original structure/function of the IP.

Embodiments of the subject invention will aid in preventing or inhibiting IP piracy of ICs that have been fabricated at untrusted semiconductor foundries and/or have been put through DFT insertion at an untrusted site. More specifically, adversaries looking to pirate the IP will have a non-functional and obfuscated version of the design that cannot be used illicitly.

Embodiments of the subject invention can enable trusted fabrication and, consequently, intellectual property protection for ICs. In the case of fabrication by an untrusted foundry, the technology of embodiments of the subject invention offers secure manufacturing of ICs for entities such as the Department of Defense (DoD), the space industry, and the military, although it may be at a reduced volume. The low volume, if applicable, is attributed to FIB circuit edit technology, because an FIB can only edit and "de-obfuscate" ICs on a one-by-one basis. However, embodiments of the subject invention alleviate the need for key management/security, which is a primary concern in the case of integrated circuit locking or encryption technologies. They also do not require a designer to maintain a separate foundry (which is the scenario for split-manufacturing, where partitions of a design are fabricated at different foundry sites) and only require a moderate-cost FIB facility.

Figure 3A:
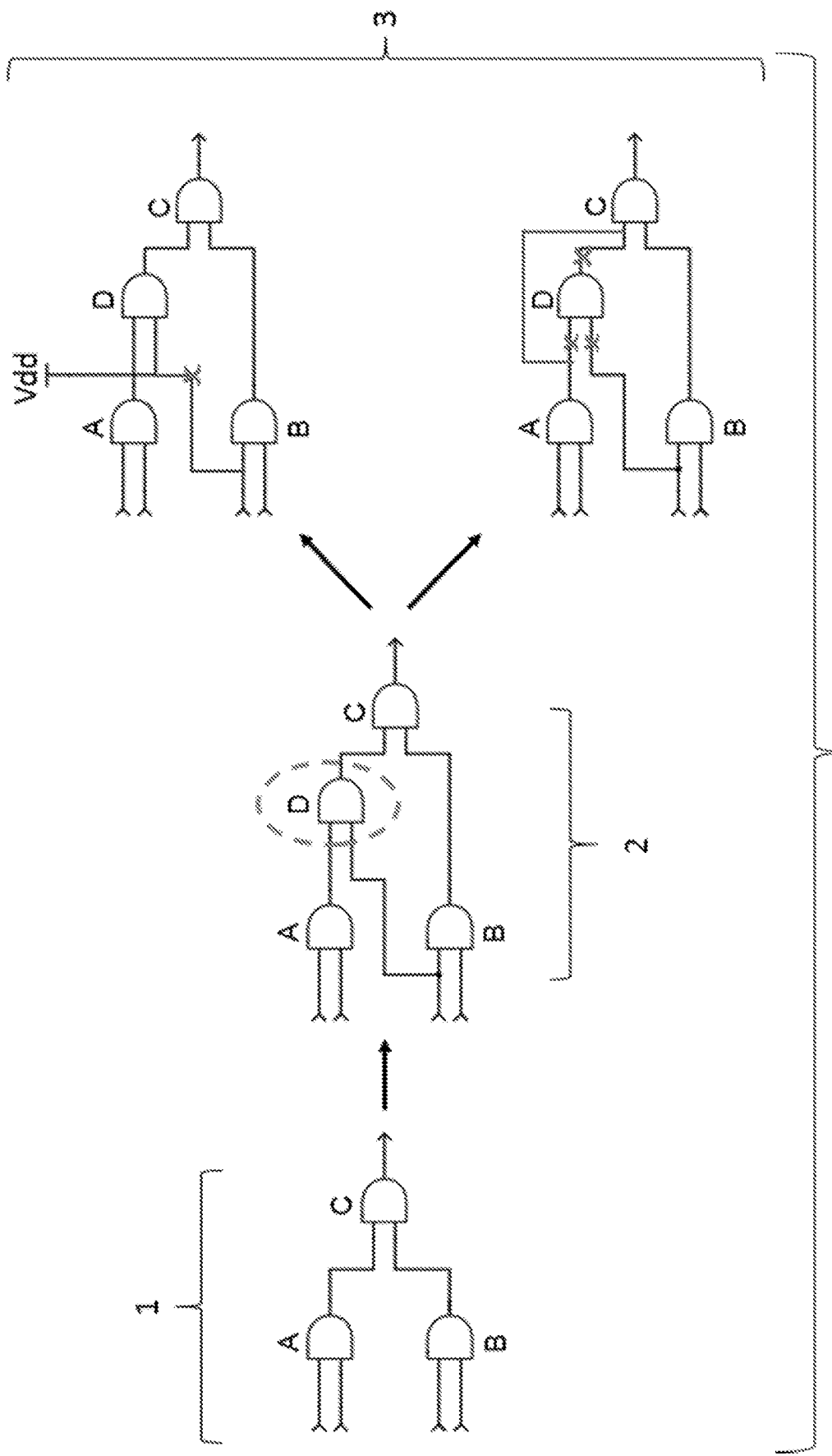
FIGS. 3A-3D show examples of circuit edits according to embodiments of the subject invention.
Figure 3B:
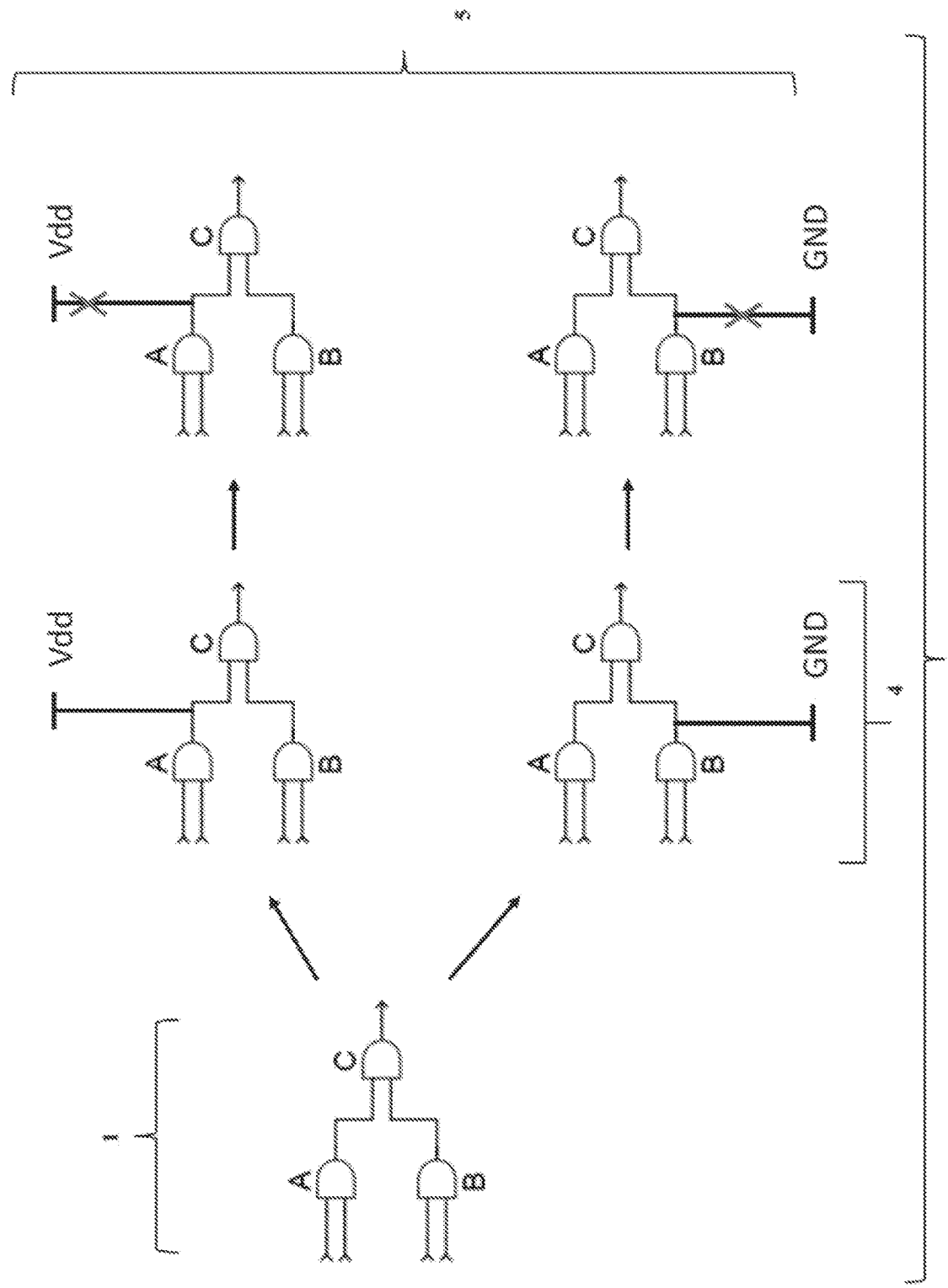
Figure 3C:
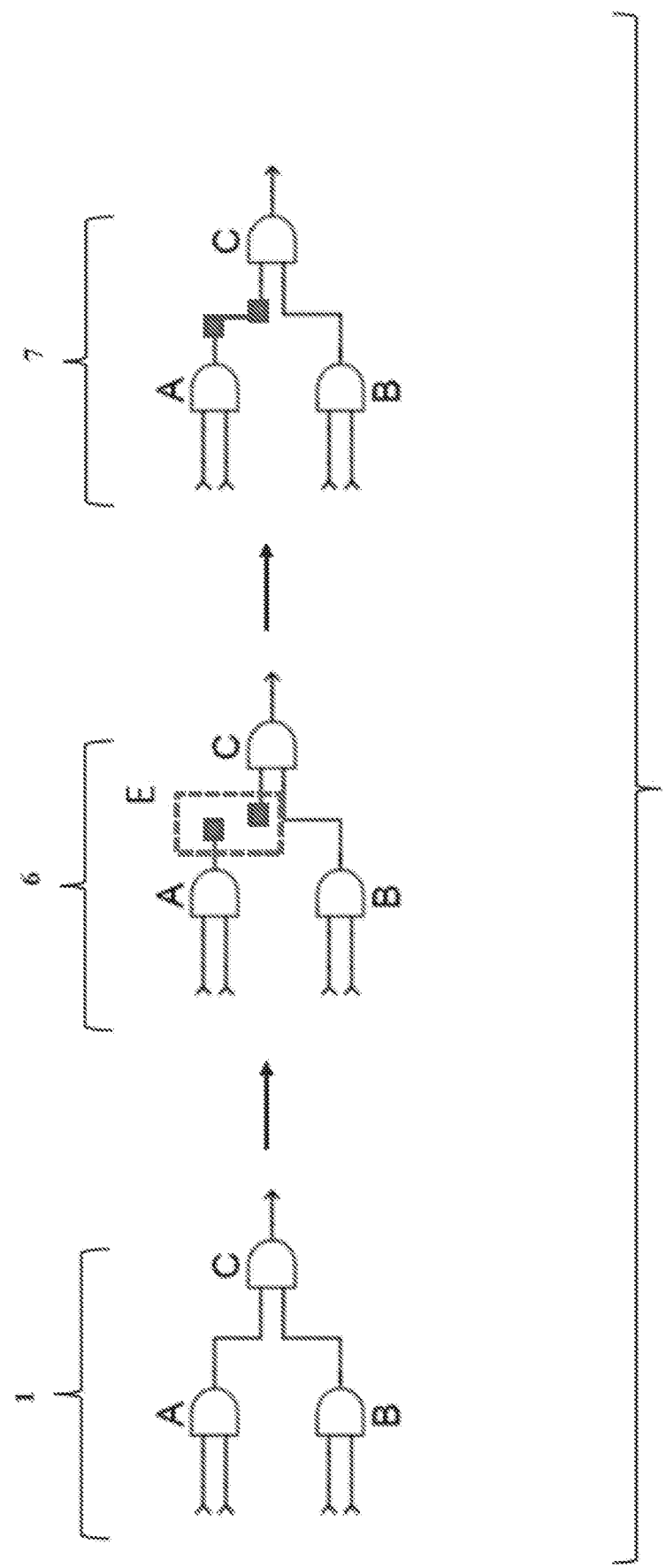

FIGS. 3A-3D show examples of circuit edits according to embodiments of the subject invention. Referring to FIGS. 3A-3C, an original design 1 can include three AND gates A, B, and C. For the original design 1, a circuit designer can intentionally insert an additional AND gate D as an obfuscated circuit in order to corrupt a correct output of the original design 1. An obfuscated design 2 including the additional AND gate D can be delivered to and fabricated by an untrusted third party foundry company. Even if the obfuscated design 2 were to be pirated, the pirating party cannot know the original design 1 because of the corrupted output and structure of the obfuscated design 2. After receiving the IC fabricated based on the obfuscated design 2, the original design 1 can be retrieved by an edit back with the FIB or an edit back at the netlist level. In an edit back design 3 with the FIB, a first input of the additional AND gate D, connected to an input of the AND gate B, can be disconnected from the AND gate B and connected to a voltage source Vdd, thereby recovering the correct output of the original design 1. Alternatively, all connections of the additional AND gate D can be disconnected from the original design 1, and an output of the AND gate A can bypass the additional AND gate D and be connected to the AND gate C, thereby producing the correct output of the original design 1. Referring to FIG. 3B, an obfuscated design 4 can include an unnecessary connection to the voltage source Vdd or a ground GND, and an edit back design 5 can include a disconnection from the voltage source Vdd or the ground GND. An obfuscated design 6 in FIG. 3C can include a disconnection part between the AND gate A and the AND gate C, and the correct output of the original design 1 can be recovered to the edit back design 7 by connecting the disconnection part of the obfuscated design 6. Note that the techniques described in FIGS. 3B and 3C do not allow for testing of circuits after fabrication at the foundry; such circuits can be edited and tested at a trusted design house.

The location of the obfuscation circuit in the gate-level design is determined in consideration of fan-out and observability of the original circuit. For example, the final score ($S_1$) for judging suitable obfuscation net can be expressed as the following formula:

$$S_i = 0.5 \cdot \frac{FO_i}{\max(FO)} + 0.5 \cdot \frac{\max(|Obs|) - |Obs_i|}{\max(|Obs|)}$$

for $i = 1, 2, \ldots, n$.

Here, FO stands for fan-out and Obs refers to the observability of each net. The observability number for each net i is subtracted from the maximum observability, as Obsi =1 is the most observable net and Obsi >1 implies that the net is more difficult to observe. Si for each net i=1, . . . , n is calculated and each net i with Si>λ (where λ is a pre-defined threshold) is noted. Out of these nets, the desired number of nets can be chosen randomly and stored for obfuscation. It should be noted that this is an example formula, and the weights and/or metrics can be modified depending on the specific circuit.

In the case of insertion of an additional gate, algorithm 1 is considered as shown below. Algorithm 1 describes the procedure for determining the type and structure of the gate inserted. The first step in this process is to analyze the static probability of each net and then, accordingly, insert an AND/OR gate (Lines 1-9). Static probability for a node is defined as the proportion of time for which the node is at logic '1' (P(1)) or '0' (P(0)) and can be readily obtained from gate-level simulation. After this step, the gates go through placement (Line 8). This step is necessary because as seen from FIG. 3A, the additional net (between the gate B and the gate D) that feeds into the gate will be cut during circuit-edit. If this net is derived from the output of a gate that is far away, the wire-length penalty and more importantly, the chance of cross-coupling with other nets in the wire is also increased. The distance of the inserted gate and other parameters (such as fan-out cone, controllability, fan-out) are calculated (Lines 14-17). If these parameters satisfy the chosen thresholds, the additional net is considered.

| Algorithm 1 Gate Insertion |
|---|
| 1:     for each net i = 1 : num(N ∈ {$S_i$ > λ} do |
| 2:         Get $P_i(0)$, $P_i(1)$ |
| 3:         if $P_i(1) > P_i(0)$ |
| 4:             insert m-input AND |
| 5:         else |
| 6:             insert m-input OR |
| 7:         end if |
| 8:         Place gates |
| 9:     end for |
| 10:    for each net i = 1 : num(N ∈ {$S_i$ > λ}) do |
| 11:         for j = 1 : num(m − 1) do |
| 12:             Evaluate Bool A for net(j) |
| 13:             Bool A = |
| 14:                 net($k_j$) ∈ {CTR(i) > γ} && |
| 15:                 Distance\|net($k_j$) − net (i)\| < α && |
| 16:                 FO($k_j$) < max(FO) && |
| 17:                 net($k_j$) ∉ $FO_{cone}$(net$_i$); |
| 18:             If A = 1, Return net($k_j$) |
| 19:         end for |
| 20:         Net Array = [net($k_1$),...,net($k_{m-1}$)] |
| 21:         Connect net(1),...,net(m − 1) to IN(1),..., IN(m − 1) |
| 22:         Connect net(i) to IN(m) |
| 23:    end for |

Figure 3D:
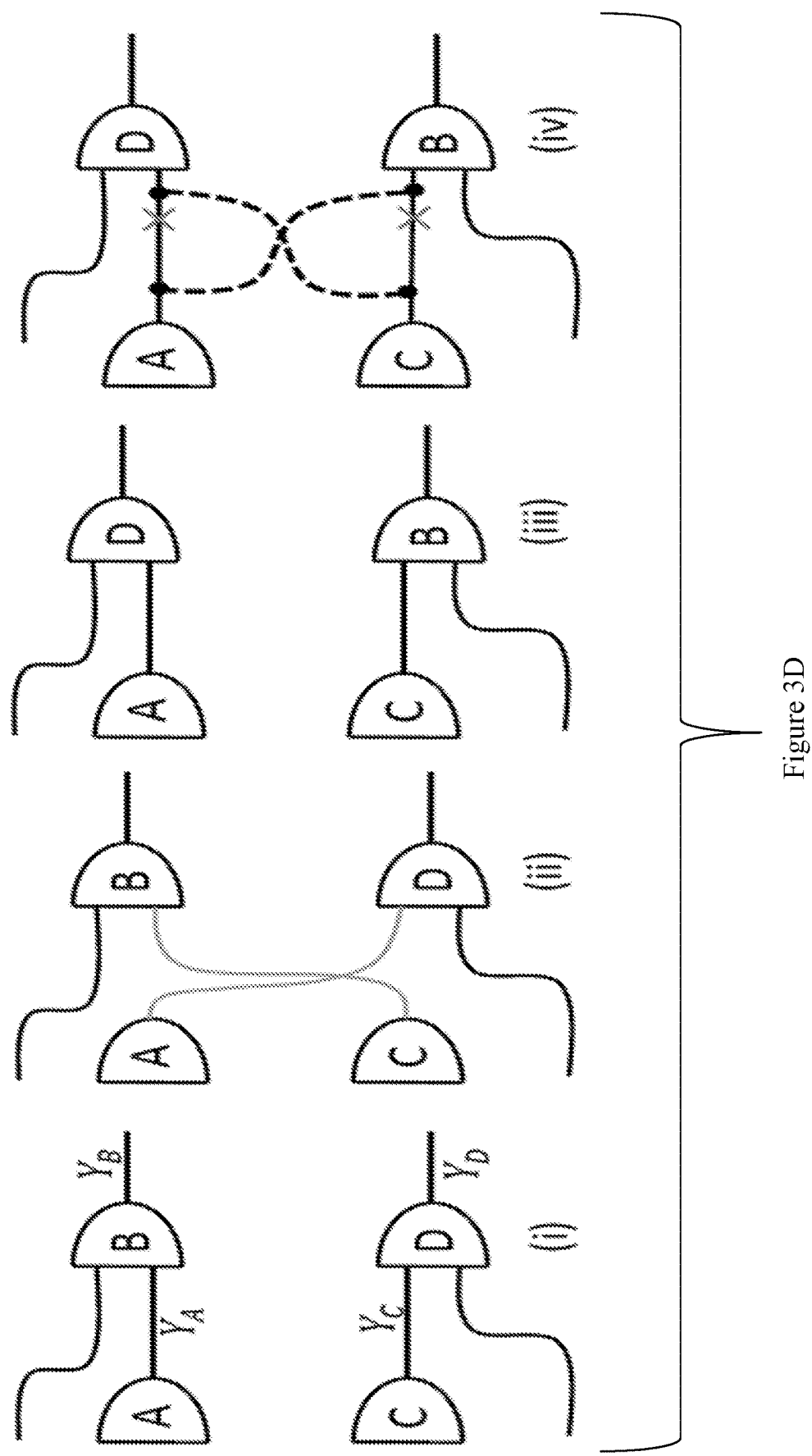

FIG. 3D shows a wire rerouting approach as another obfuscation circuit. For the original circuit (i), nets $Y_A$ and $Y_C$ have been swapped during obfuscation, and the place-and-route tool rearranges the gates A-D in order to reduce wire-length. That is, the original circuit (i) has been changed to the replacement circuit (iii) including an obfuscation circuit. In order to recover the nets $Y_B$ and $Y_D$, the connection between the gate A and the gate D and the connection between the gate C and the gate B are disconnected and the connections between the gate A and the gate B and between the gate C and the gate D are made. The choice of the wires to reroute can be made by performing a probability analysis of the wires. Wires that differ in probability by a defined threshold can be accepted for swapping.

The protection using these edit back processes including the obfuscated design includes Hard/Firm IP protection geared for digital/mixed-signal circuits. In addition, it also protects overproduction and is effective for low volume IC production for research labs, defense applications, or space applications. Circuit edit methods such as edit back can cost on the order of $100,000 to $1 million and is therefore very attractive compared to the cost of maintaining a foundry facility, which can be more than $1 billion. Though certain examples of circuit editing according to embodiments of the subject invention have been shown and discussed, these are for exemplary purposes only and should not be construed as limiting. Various other types of edits can be made to the circuit(s) within the spirit of embodiments of the subject invention.

Figure 4:
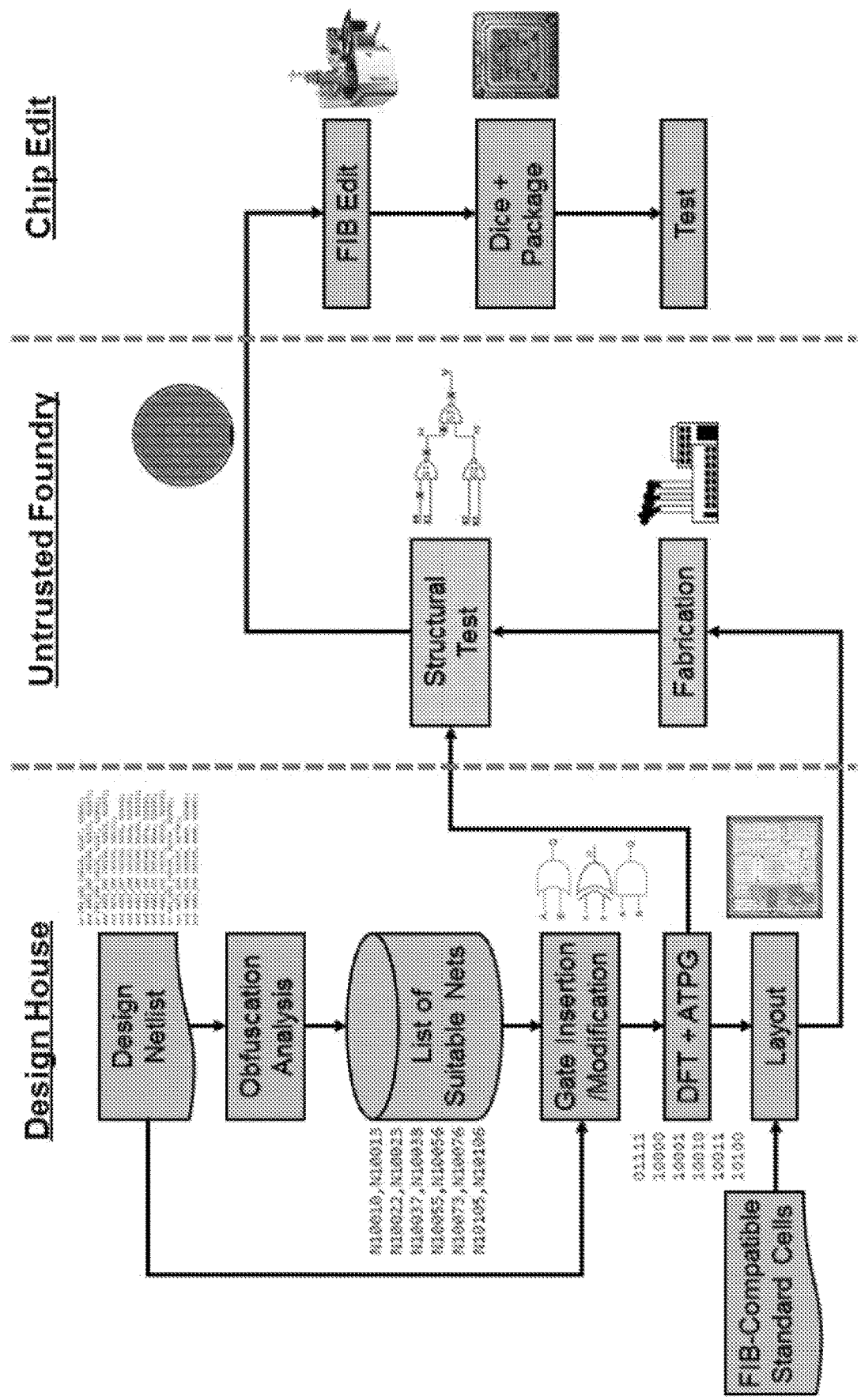
FIG. 4 shows a chip editor flow for untrusted fabrication according to an embodiment of the subject invention.

FIG. 4 shows a chip editor flow according to an embodiment of the subject invention, which can be used when an untrusted foundry is used for fabrication. First, a design house (e.g., DoD) designs an original circuit, analyzes obfuscation, forms a list of suitable nets, and inserts a logic gate or modifies the original circuit to create an obfuscation circuit. The design house can insert DFT and form a layout changing the original circuit to an obfuscation circuit. The final layout can be configured to include FIB-compatible standard cells. The final layout can be sent to the untrusted foundry for fabrication and then the fabricated chip can be tested. The fabricated chip including the original circuit and the obfuscated circuit can be sent to a chip edit party (e.g., a design house), and the fabricated chip can be edited back by the FIB to retrieve the original circuit. The edited back chip can be diced and packaged, and then be tested or brought to market.

Figure 5:
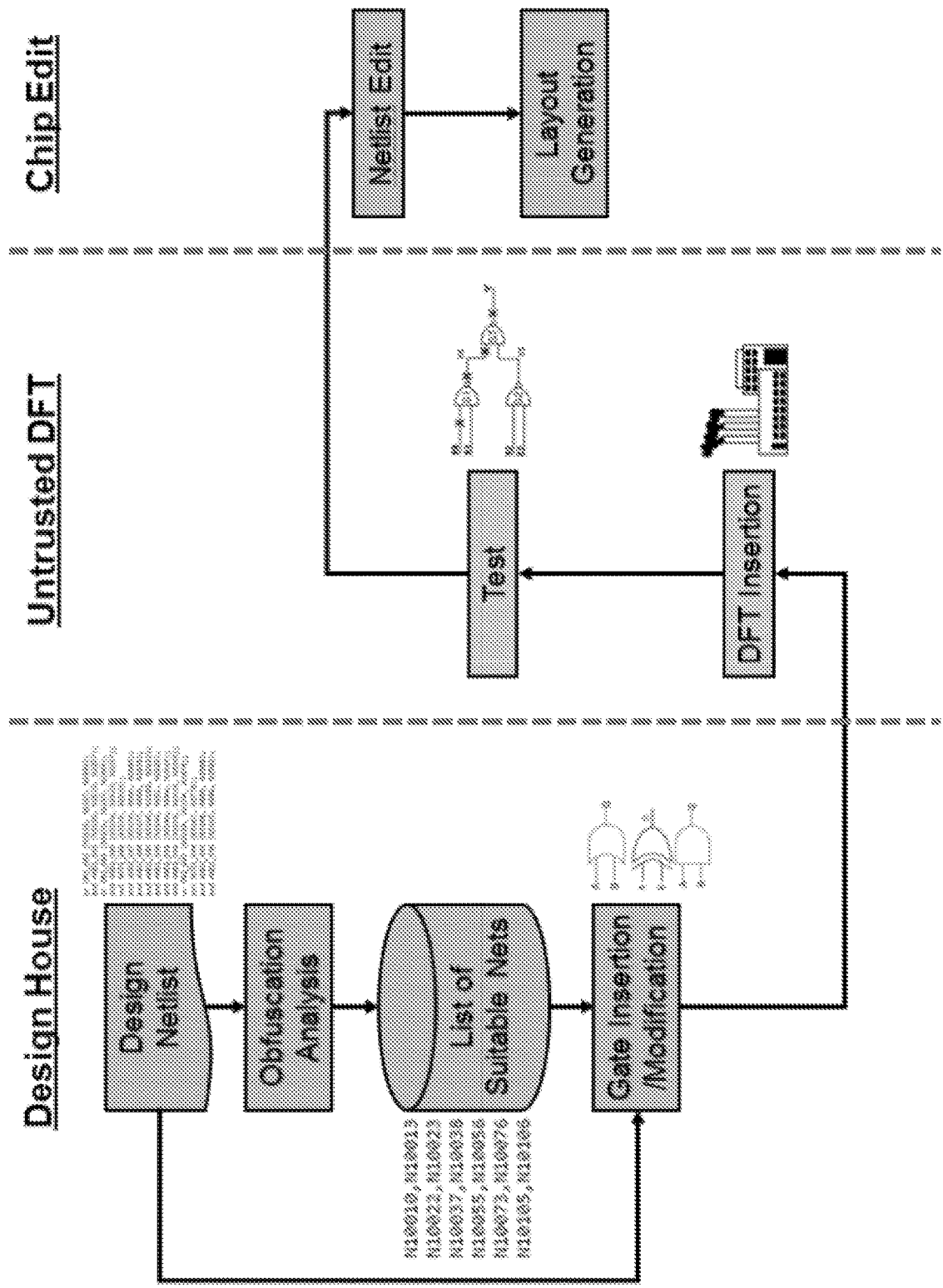
FIG. 5 shows a chip editor flow for design-for-test (DFT) insertion at untrusted facility according to an embodiment of the subject invention.

FIG. 5 shows a chip editor flow according to an embodiment of the subject invention, which can be used when the DFT is inserted by an untrusted DFT facility. The design house can provide the DFT facility with circuit information including the obfuscated circuit netlist (e.g., logic gate insertion or modification). The DFT facility can then perform the DFT insertion on the obfuscated netlist. After receiving the DFT-inserted netlist, the chip edit party (e.g., design house) can edit the received netlist so as to retrieve the original circuit (and possibly then generate a layout corresponding to the original circuit).

Figure 6A:
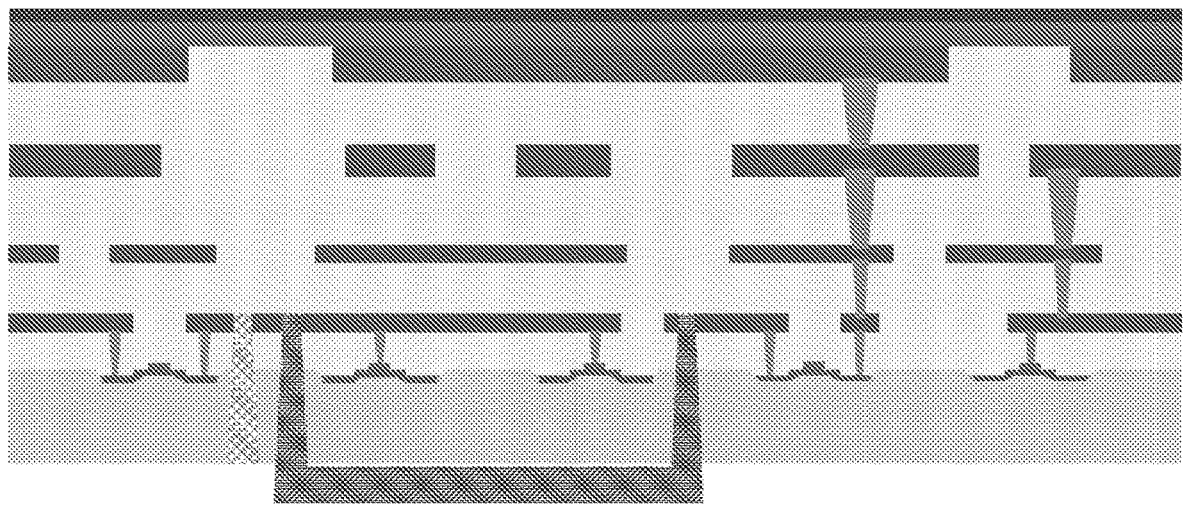
FIGS. 6A and 6B show cross-sectional views of FIB-based circuit edits according to embodiments of the subject invention.
Figure 6B:
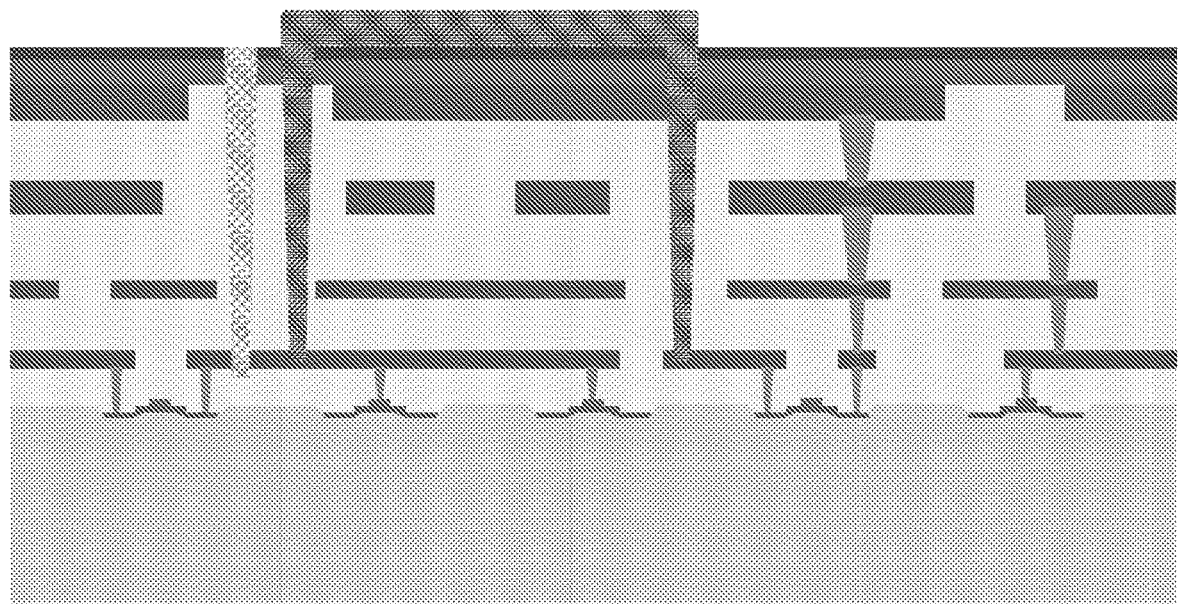

FIGS. 6A and 6B show examples of an FIB based circuit edit according to embodiments of the subject invention. FIG. 6A shows a cross-sectional view of a chip edited by a backside FIB edit. An FIB milling can be performed from the back side of a wafer on which a circuit is fabricated, and a connection by an FIB deposition can also be formed on the back side of the wafer. For the backside FIB edit, a wafer thinning may be required in order to reduce a thickness of the wafer, thereby providing more access to transistors of the chip. FIG. 6B shows a cross-sectional view of a chip edited by a frontside FIB edit, in which the FIB milling and the FIB deposition can be performed on a front side of the wafer. As the number of metal layers used for manufacturing the chip increases, the difficulty of FIB milling and FIB deposition also increases. Thus, it is not easy to perform a frontside FIB edit to a chip including more than eight metal layers, but the frontside FIB edit can be applicable to edit higher metal layers that have a clear and unobstructed path from the top side of the chip. In addition, in order to make the circuit edit easy, FIB-friendly layout (e.g., Modified Standard Cell Layouts similar to FIG. 7 or Fiducial Points), and/or CAD-assisted FIB navigation can be used.

Figure 7:
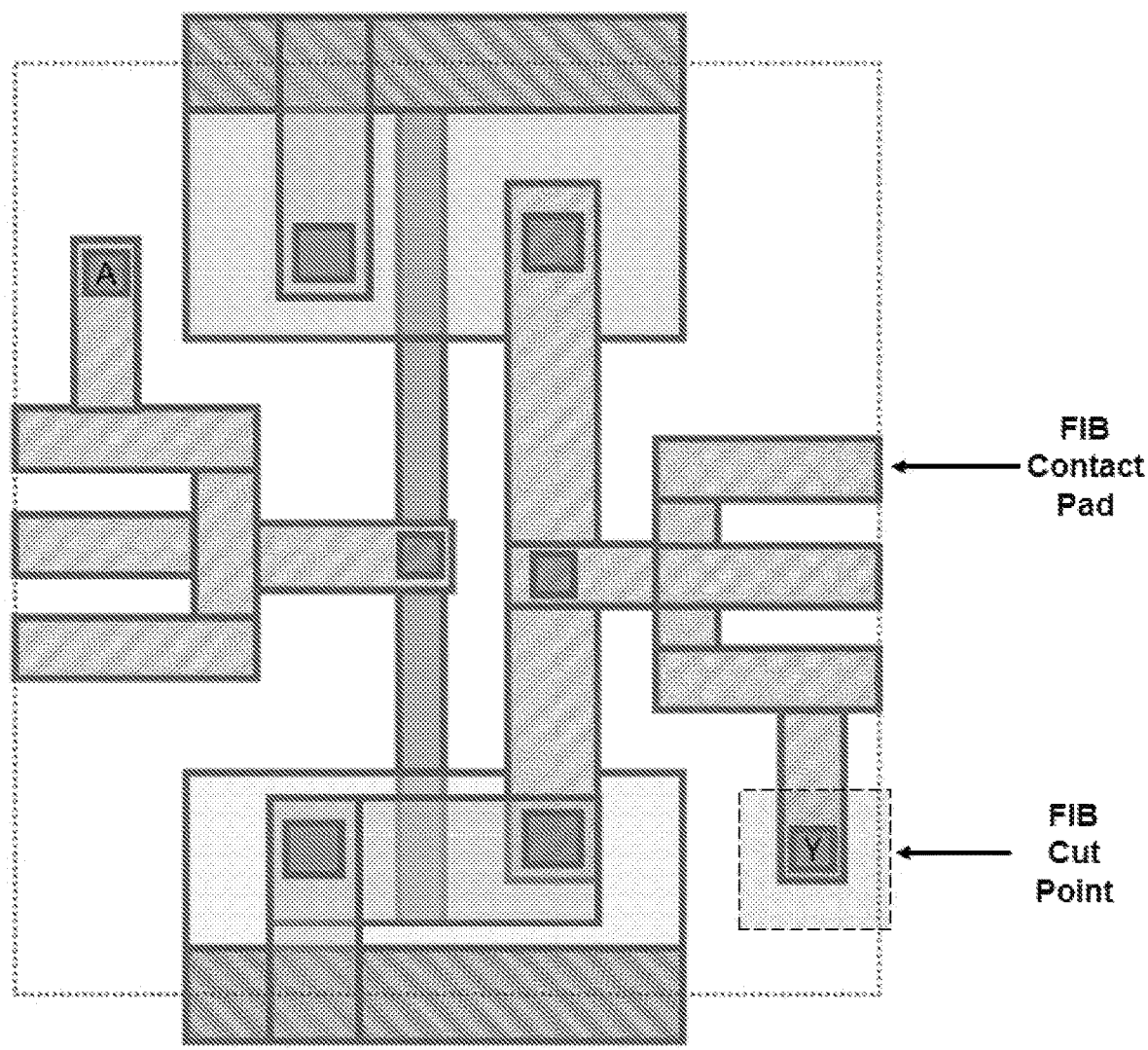
FIG. 7 shows a sample inverter layout including a design for a circuit edit according to an embodiment of the subject invention.

FIG. 7 shows a sample inverter layout including a design for circuit edit according to an embodiment of the subject invention. This layout can be useful for backside edits. When a logic gate that is inserted for obfuscation is one of AND, OR, and XOR, one input of the logic gate can be required to be connected to the voltage source Vdd or the ground GND during the circuit edit process. When the logic gate that is inserted for obfuscation is one of NAND and NOR, the connection of the logic gate can be disconnected from a net of the original circuit and rerouting of the net can be required. In consideration of FIB damage and the ease of the backside FIB process, an FIB-compatible standard cell can be provided, which includes an FIB contact pad (e.g., of an area of about 500 nm$^2$ (or less)) at an input node and an FIB cut pad of an isolating area (e.g., with an area of about 500 nm$^2$ (or less)). Assuming the worst case in which FIB milling aspect ratio is poor, the above pads can be necessary in order to prevent or inhibit inadvertent FIB damage to neighboring active regions. In addition, it can be necessary to size up the gates in the circuit in order to accommodate high fan-out and/or drive the FIB deposited wires.

Figure 8A:
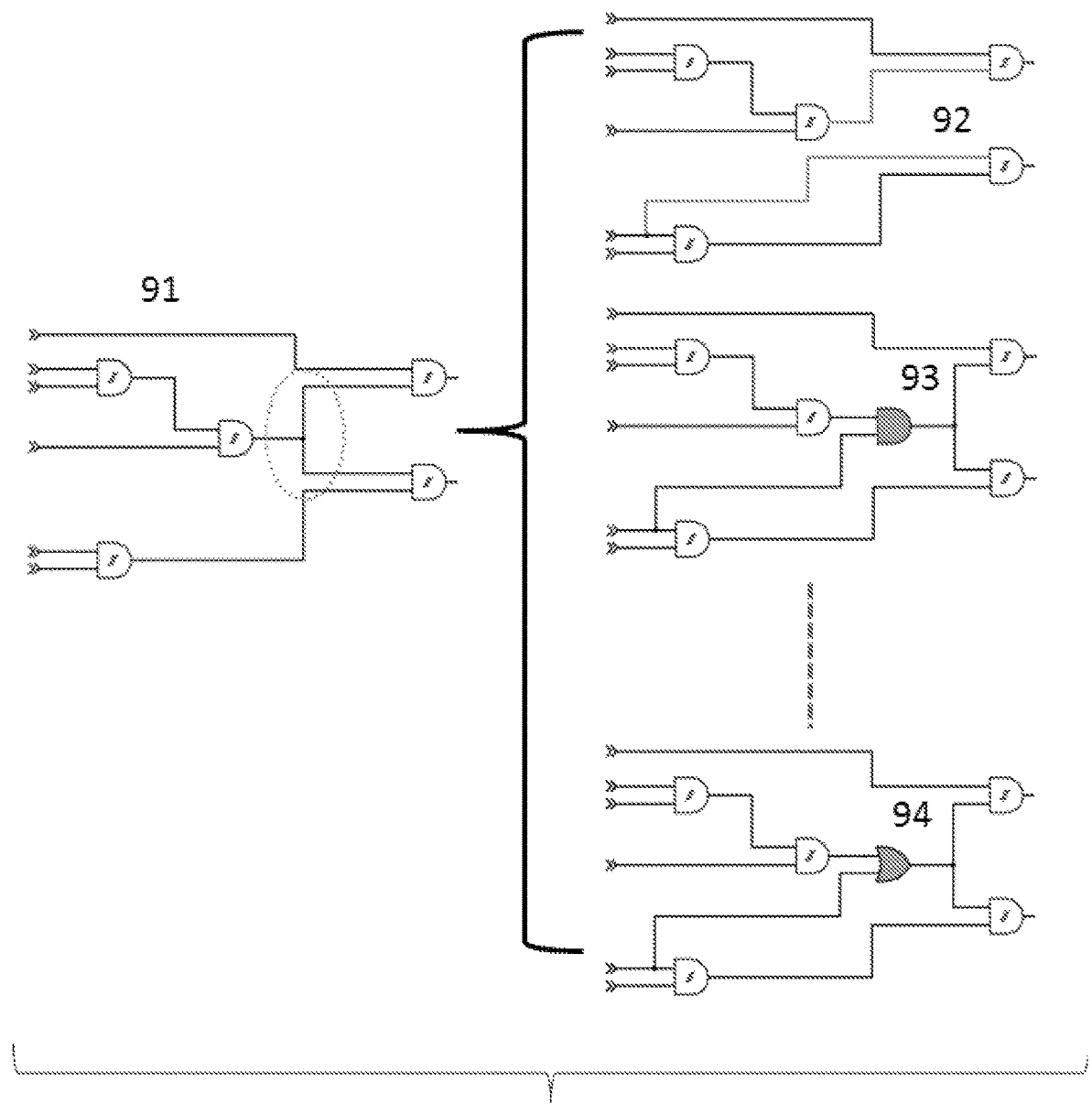
FIGS. 8A and 8B show obfuscation analysis at a netlist level according to embodiments of the subject invention.
Figure 8B:
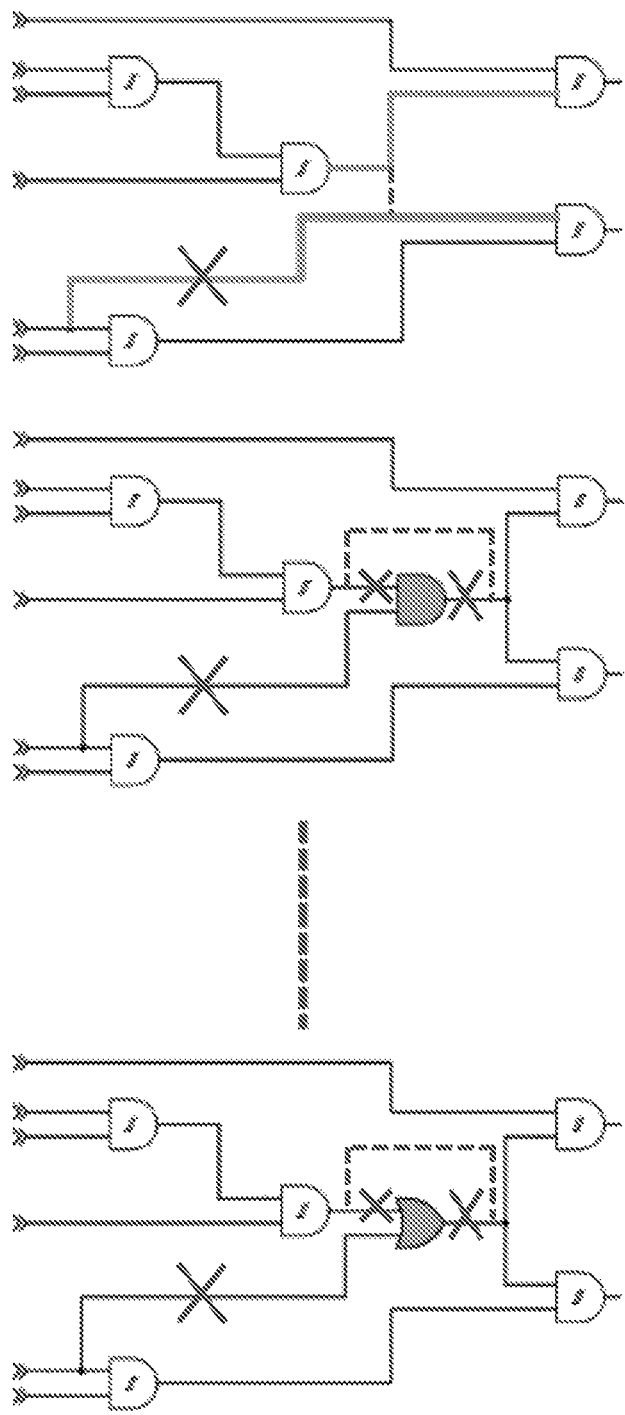

FIG. 8A shows an obfuscation analysis at a netlist level according to an embodiment of the subject invention. When an obfuscated circuit is inserted into an original circuit, a circuit designer should insert a minimal number of changes into a netlist level design and skew the design as far away from the original circuit function as possible. Thus, an original circuit 91 can be modified, for example, so as to include a rerouting portion 92, an AND gate 93, or an OR gate 94. These are shown for exemplary purposes only, and embodiments are not limited thereto as many different techniques are possible (e.g., NAND, NOR, or rerouting pre-existing net). FIG. 8B shows edit back circuits according to an embodiment of the subject invention. In the edit back circuits 95, 96, and 97, a disconnection, a new connection, and a rerouting can be performed to retrieve the original circuit 91.

The subject invention includes, but is not limited to, the following exemplified embodiments.

Embodiment 1

A circuit comprising:
an original circuit configured to become an obfuscated circuit with a different output from the original circuit,
wherein the obfuscated circuit is configured to recover the output of the original circuit upon modification of the obfuscated circuit.

Embodiment 2

The circuit according to embodiment 1, wherein the obfuscated circuit includes a logic gate, a rerouted connection, or both.

Embodiment 3

The circuit according to embodiment 2, wherein the logic gate is at least one selected from an inverter, NAND, NOR, XOR, AND, and OR.

Embodiment 4

The circuit according to any of embodiments 1-3, wherein the output of the original circuit is recovered by disconnecting the obfuscated circuit (e.g., added logic gates of the obfuscated circuit).

Embodiment 5

The circuit according to any of embodiments 1-4, wherein the output of the original circuit is recovered by rerouting so as to bypass the obfuscated circuit.

Embodiment 6

The circuit according to any of embodiments 1-5, wherein the obfuscated circuit includes a connection to a voltage source or a ground.

Embodiment 7

A semiconductor device comprising:
a substrate;
an original circuit formed on the substrate and configured to become an obfuscated circuit with a different output from the original circuit;
and
a pad for recovering the output of the original circuit upon modification of the obfuscated circuit.

Embodiment 8

The semiconductor device according to embodiment 7, wherein the pad is a cut pad for disconnecting the obfuscated circuit from the original circuit.

Embodiment 9

The semiconductor device according to embodiment 7, wherein the pad is a contact pad for rerouting the original circuit.

Embodiment 10

The semiconductor device according to embodiment 9, wherein the contact pad is connected with the original circuit via a metal contact (e.g., tungsten contact or a platinum contact).

Embodiment 11

The semiconductor device according to any of embodiments 7-10, wherein the obfuscated circuit comprises a first logic gate including at least one selected from AND, OR, and XOR.

Embodiment 12

The semiconductor device according to embodiment 11, wherein the first logic gate is configured such that a first input of the first logic gate is disconnected from the original circuit and the disconnected first input is connected to a voltage source VDD or a ground GND.

Embodiment 13

The semiconductor device according to any of embodiments 11-12, wherein a second input of the first logic gate is connected to the original circuit.

Embodiment 14

The semiconductor device according to any of embodiments 7-13, wherein the obfuscated circuit comprises a second logic gate including at least one selected from NAND and NOR.

Embodiment 15

The semiconductor device according to embodiment 14, wherein the second logic gate is configured such that an input of the second logic gate is disconnected from the original circuit and the original circuit bypasses the second logic gate.

Embodiment 16

A method of manufacturing a semiconductor device comprising:
designing an original circuit configured to become an obfuscated circuit with a different output from the original circuit; and
fabricating the original circuit,
wherein the obfuscated circuit is configured to change an output of the original circuit and to recover the output of the original circuit upon modification of the obfuscated circuit.

Embodiment 17

The method according to embodiment 16, wherein the designing the circuit includes inserting a logic gate or modifying the original circuit.

Embodiment 8

The method according to any of embodiments 16-17, further comprising editing the circuit.

Embodiment 19

The method according to embodiment 18, wherein the editing of the circuit includes milling by a focus-in-beam (FIB) and/or depositing by the FIB.

Embodiment 20

The method according to any of embodiments 18-19, wherein the editing of the circuit comprises editing a back side or a front side of a wafer on which the circuit is fabricated.

Embodiment 21

The method according to embodiment 20, further comprising thinning the wafer before the editing the circuit on the back side of the wafer.

Embodiment 22

The method according to any of embodiments 20-21, further comprising dicing the wafer and packaging the diced wafer.

Embodiment 23

The method according to any of embodiments 16-22, wherein the designing of the circuit includes forming a netlist, analyzing obfuscation, and forming a list of suitable nets.

Embodiment 24

A method for designing a chip comprising:
forming a netlist for an integrated circuit; and
modifying the netlist,
wherein the modifying of the netlist corrupts an intended output of the integrated circuit.

Embodiment 25

The method according to embodiment 24, further comprising inserting a design-for-test (DFT) into the modified netlist.

Embodiment 26

The method according to any of embodiments 24-25, further comprising editing the netlist or the modified netlist.

Embodiment 27

The method according to embodiment 26, further comprising generating a layout based on the edited netlist.

Embodiment 28

The method according to any of embodiments 24-27, wherein the modifying of the netlist includes inserting a logic gate into the netlist or rerouting a pre-existing net.

Embodiment 29

The method according to any of embodiment 24-28, further comprising analyzing obfuscation and forming a list of suitable nets between the forming of the netlist and the modifying of the netlist.

It should be understood that the examples and embodiments described herein are for illustrative purposes only and that various modifications or changes in light thereof will be suggested to persons skilled in the art and are to be inclined within the sprit and purview of this application.

All patents, patent applications, provisional applications, and publications referred to or cited herein (including those in the "References" section, if present) are incorporated by reference in their entirety, including all figures and tables, to the extent they are not inconsistent with the explicit teachings of this specification.

REFERENCES

1. The new economics of semiconductor manufacturing, IEEE Spectrum, 2008 [http://spectrum.ieee.org/semiconductors/design/the-new-economics-of-semiconductor-manufacturing]
2. Rajendran et. Al, 'Fault Analysis Based Logic Encryption", IEEE Transactions on Computers, February 2015.
3. Rajendran et. Al, 'Is split manufacturing secure?' Proceeding of the Conference on Design, Automation and Test in Europe, pp. 1259-1264, EDA Consortium, 2013.
4. Rajendran et. Al, 'Security Analysis of Integrated Circuit Camouflaging', ACM CCS, pp. 709-720, 2013.
5. Poughkeepsie Journal, 'It's Day One as GlobalFoundries for ex-IBM plant', July '15, [http://www.poughkeepsiejournal.com/story/money/2015/06/30/impacts-plentiful-ibm-globalfoundries-deal/29516915/]1.

What is claimed is:

1. A method of manufacturing a semiconductor device comprising:
designing an original circuit configured to become an obfuscated circuit with a different output from the original circuit,
wherein configuring the original circuit to become the obfuscated circuit comprises adding an element to the original circuit to obfuscate the original circuit, and
wherein the element comprises at least one of a logic gate or a net;
fabricating the obfuscated circuit; and
editing the fabricated obfuscated circuit,
wherein the obfuscated circuit is configured to change an output of the original circuit and to recover the output of the original circuit upon the editing of the fabricated obfuscated circuit, and
wherein the editing of the fabricated obfuscated circuit comprises removing the added element from the fabricated obfuscated circuit.

2. The method according to claim 1, wherein the editing of the fabricated obfuscated circuit comprises at least one of milling by a focused-ion-beam (FIB) or depositing by the FIB.

3. The method according to claim 2, wherein the editing of the fabricated obfuscated circuit comprises editing a back side or a front side of a wafer on which the obfuscated circuit is fabricated.

4. The method according to claim 3, further comprising thinning the wafer before the editing of the fabricated obfuscated circuit on the back side of the wafer.

5. The method according to claim 3, further comprising dicing the wafer and packaging the diced wafer.

6. The method according to claim 1, wherein the designing of the original circuit configured to become the obfuscated circuit comprises forming a netlist, analyzing obfuscation, and forming a list of suitable nets.

7. The method according to claim 1, wherein the element is a logic gate.

8. The method according to claim 7, wherein the logic gate is at least one selected from a group consisting of an inverter, NAND, NOR, XOR, AND, and OR.

9. The method according to claim 1, wherein the element is a first net.

10. The method according to claim 9, wherein the first net couples a second net of the original circuit to a voltage source or a ground.

11. The method according to claim 1, wherein the fabricated obfuscated circuit comprises a pad for recovering the output of the original circuit upon the editing of the obfuscated circuit.

12. The method according to claim 11, wherein the pad is a cut pad for disconnecting the element from the original circuit or a contact pad for rerouting the original circuit.

13. The method according to claim 12, wherein the contact pad is connected with the original circuit via a tungsten contact or a platinum contact.

14. The method according to claim 1, wherein the obfuscated circuit comprises a first logic gate selected from a group consisting of NAND, NOR, AND, OR, and XOR.

15. The method according to claim 14, wherein the first logic gate is configured such that a first input of the first logic gate is disconnected from the first logic gate and the disconnected first input is connected to a first input of a second logic gate of the device, and wherein the second logic gate is configured such that a second input originally connected to the first input of the second logic gate is disconnected from the second logic gate and the disconnected second input is connected to the first input of the first logic gate.

16. The method according to claim 15, wherein remaining inputs of the first logic gate and the second logic gate remain connected to the original circuit.

17. The method according to claim 1, wherein the obfuscated circuit comprises a second logic gate selected from a group consisting of an inverter, AND, OR, XOR, NAND and NOR.

18. The method according to claim 17, wherein the second logic gate is configured such that an input of the second logic gate is disconnected from the second logic gate and the original circuit bypasses the second logic gate by making a direct connection to the input.

19. A method for designing a chip comprising:
forming a netlist for an integrated circuit;
modifying the netlist,
wherein the modifying of the netlist comprises adding an element to the netlist to obfuscate the integrated circuit and to corrupt an intended output of the integrated circuit, and
wherein the element comprises at least one of a logic gate or a net;
fabricating the chip based on the modified netlist; and
editing the fabricated chip,
wherein the modified netlist is configured to recover the intended output of the integrated circuit upon the editing of the fabricated chip, and
wherein the editing of the fabricated chip comprises removing the added element from the fabricated chip.

20. The method according to claim 19, further comprising inserting a design-for-test (DFT) into the modified netlist.

21. The method according to claim 19, wherein the removing of the added element comprises at least one of milling by a focused-ion-beam (FIB) or depositing by the FIB.

22. The method according to claim 21, further comprising generating a layout based on the modified netlist.

23. The method according to claim 22, wherein the modifying of the netlist comprises inserting a logic gate into the netlist or rerouting a pre-existing net.

24. The method according to claim 23, further comprising analyzing obfuscation and forming a list of suitable nets between the forming of the netlist and the modifying of the netlist.

\* \* \* \* \*